United States Patent
Chen

(10) Patent No.: US 10,670,263 B2
(45) Date of Patent: Jun. 2, 2020

(54) BURNING DEVICE WITH AN AIR AMPLIFIER

(71) Applicant: Pro-Iroda Industries, Inc., Taichung (TW)

(72) Inventor: Wei-Long Chen, Taichung (TW)

(73) Assignee: Pro-Iroda Industries, Inc., Taichung (TW)

( * ) Notice: Subject to any disclaimer, the term of this patent is extended or adjusted under 35 U.S.C. 154(b) by 168 days.

(21) Appl. No.: 15/863,268

(22) Filed: Jan. 5, 2018

(65) Prior Publication Data

US 2018/0209642 A1 Jul. 26, 2018

(30) Foreign Application Priority Data

Jan. 26, 2017 (TW) .............................. 106103169 A

(51) Int. Cl.
| | |
|---|---|
| *F23D 14/70* | (2006.01) |
| *F23D 14/38* | (2006.01) |
| *F23D 14/28* | (2006.01) |
| *F23D 14/62* | (2006.01) |
| *F24H 3/04* | (2006.01) |

(52) U.S. Cl.
CPC ............. *F23D 14/70* (2013.01); *F23D 14/28* (2013.01); *F23D 14/38* (2013.01); *F23D 14/62* (2013.01); *F24H 3/0488* (2013.01)

(58) Field of Classification Search
CPC .......... F23D 14/38; F23D 14/62; F23D 14/70; F24H 3/0488
USPC ....................................................... 431/345
See application file for complete search history.

(56) References Cited

U.S. PATENT DOCUMENTS

| | | | |
|---|---|---|---|
| 3,589,315 A | * | 6/1971 | Hart .......................... F23G 5/32 110/265 |
| 3,994,674 A | | 11/1976 | Baumann et al. |
| 7,354,265 B2 | | 4/2008 | Mashhour et al. |
| 2013/0127193 A1 | | 5/2013 | Regan et al. |

FOREIGN PATENT DOCUMENTS

| | | |
|---|---|---|
| CN | 2727561 Y | 9/2005 |
| CN | 2727563 Y | 9/2005 |
| CN | 10190036 U | 12/2010 |

(Continued)

*Primary Examiner* — Grant Moubry
*Assistant Examiner* — Aaron H Heyamoto
(74) *Attorney, Agent, or Firm* — Alan D. Kamrath; Karin L. Williams; Mayer & Williams PC

(57) ABSTRACT

A burning device includes a body and an air amplifier mounted in the body. The air amplifier includes a fuel channel between an inlet and an outlet of the air amplifier. The fuel channel includes an intermediate section between an inlet section and an outlet section. A width of the inlet section gradually decreases from the inlet towards the intermediate section. A width of the outlet section gradually increases from the intermediate section towards the outlet. A width of the intermediate section is smaller than the width of the inlet section and the width of the outlet section. The air amplifier includes a plurality of side channels. Each side channel extends along an extending axis not intersecting with a longitudinal axis of the fuel gas channel and includes an inner end intercommunicating with the fuel channel and an outer end intercommunicating with an outer periphery of the air amplifier.

6 Claims, 6 Drawing Sheets

(56) References Cited

FOREIGN PATENT DOCUMENTS

| | | | |
|---|---|---|---|
| CN | 202228445 U | | 5/2012 |
| CN | 202484999 U | | 10/2012 |
| CN | 203431866 U | | 2/2014 |
| CN | 103868063 A | | 6/2014 |
| CN | 104826888 A | | 8/2015 |
| DE | 3928214 A1 | | 3/1990 |
| EP | 2937631 A1 | | 10/2015 |
| FR | 993241 A | * 10/1951 | ............. F23D 14/38 |
| JP | H102558 A | | 1/1998 |

* cited by examiner

BURNING DEVICE WITH AN AIR AMPLIFIER

BACKGROUND OF THE INVENTION

The present invention relates to a burning device and, more particularly, to a burning device with an air amplifier.

China Patent Publication No. 104826888A discloses an air amplifier capable of increasing the amount of airflow. The air amplifier includes a sleeve and a lining inside the sleeve. The sleeve includes a through-hole. A portion of the lining corresponding to the through-hole converges, such that a sealed space formed between the sleeve and the lining intercommunicates with the through-hole for receiving external compressed air. A gap is formed between an inlet end of the lining and the sleeve and intercommunicates with the sealed space. The gap intercommunicates with an air passage in the lining. An inner wall of the inlet end is rounded, such that the air entered via the through-hole, the sealed space, and the gap creates the Coanda effect at the rounded inner wall.

Generally, an interior of a fuel container connected to the burning device is in a high pressure state, and the burning device releases the fuel gas in the fuel container. The fuel gas mixes with air and is then ignited to form a jet flame or a hot wind.

However, currently available burning devices are not provided with air amplifiers and, thus, only utilize the pressure in the fuel container to blow the hot wind outward, having a disadvantage of insufficient amount of wind. Although the above air amplifier can be used to increase the amount of airflow, the issue of insufficient amount of wind is not completely solved.

Thus, a need exists for a novel burning device with an air amplifier to overcome the above disadvantages.

BRIEF SUMMARY OF THE INVENTION

The primary objective of the present invention is to provide a burning device with an air amplifier. The burning device includes a body and an air amplifier mounted in the body. The air amplifier includes an inlet and an outlet opposite to the inlet. The air amplifier includes a fuel channel extending along a longitudinal axis and having two ends respectively connected to the inlet and the outlet. The fuel channel includes an inlet section adjacent to the inlet and an outlet section adjacent to the outlet. The fuel channel further includes an intermediate section between the inlet section and the outlet section. Each of the inlet section, the intermediate section, and the outlet section has a width in a width direction perpendicular to the longitudinal axis. The width of the inlet section gradually decreases from the inlet towards the intermediate section. The width of the outlet section gradually increases from the intermediate section towards the outlet. The width of the intermediate section is smaller than the width of the inlet section and the width of the outlet section. The air amplifier includes a plurality of side channels. Each of the plurality of side channels extends along an extending axis not intersecting with the longitudinal axis. Each of the plurality of side channels includes an inner end intercommunicating with the fuel channel and an outer end intercommunicating with an outer periphery of the air amplifier.

In an example, each of the plurality of side channels passively introduces air from an outside of the air amplifier.

In an example, each of the plurality of side channels intercommunicates with the outlet section of the fuel channel.

In an example, a spacing between the outer end of each of the plurality of side channels and the inlet along the longitudinal axis is smaller than a spacing between the inner end of each of the plurality of side channels and the inlet along the longitudinal axis.

In an example, the burning device further includes an extension tube having a first end connected to the outlet of the air amplifier. The extension tube has an inner width in the width direction perpendicular to the longitudinal axis. The inner width of the extension tube is equal to a maximum width of the outlet section in the width direction.

In an example, the burning device further includes a self-cooling device having a central zone and a peripheral zone. The peripheral zone surrounds the central zone about the longitudinal axis. The extension tube further includes a second end opposite to the air amplifier and connected to the self-cooling device. The extension tube is configured to blow out a large portion of a mixture of air and a fuel gas via the central zone. The peripheral zone includes a side opposite to the extension tube and is configured to suck air via the side thereof.

In an example, the body includes a fuel gas supplier and a trigger connected to the fuel gas supplier. The trigger is configured to control opening and closing of the fuel gas supplier. The inlet of the air amplifier is connected to the fuel gas supplier.

The present invention will become clearer in light of the following detailed description of illustrative embodiments of this invention described in connection with the drawings.

DETAILED DESCRIPTION OF THE INVENTION

Figure 1:
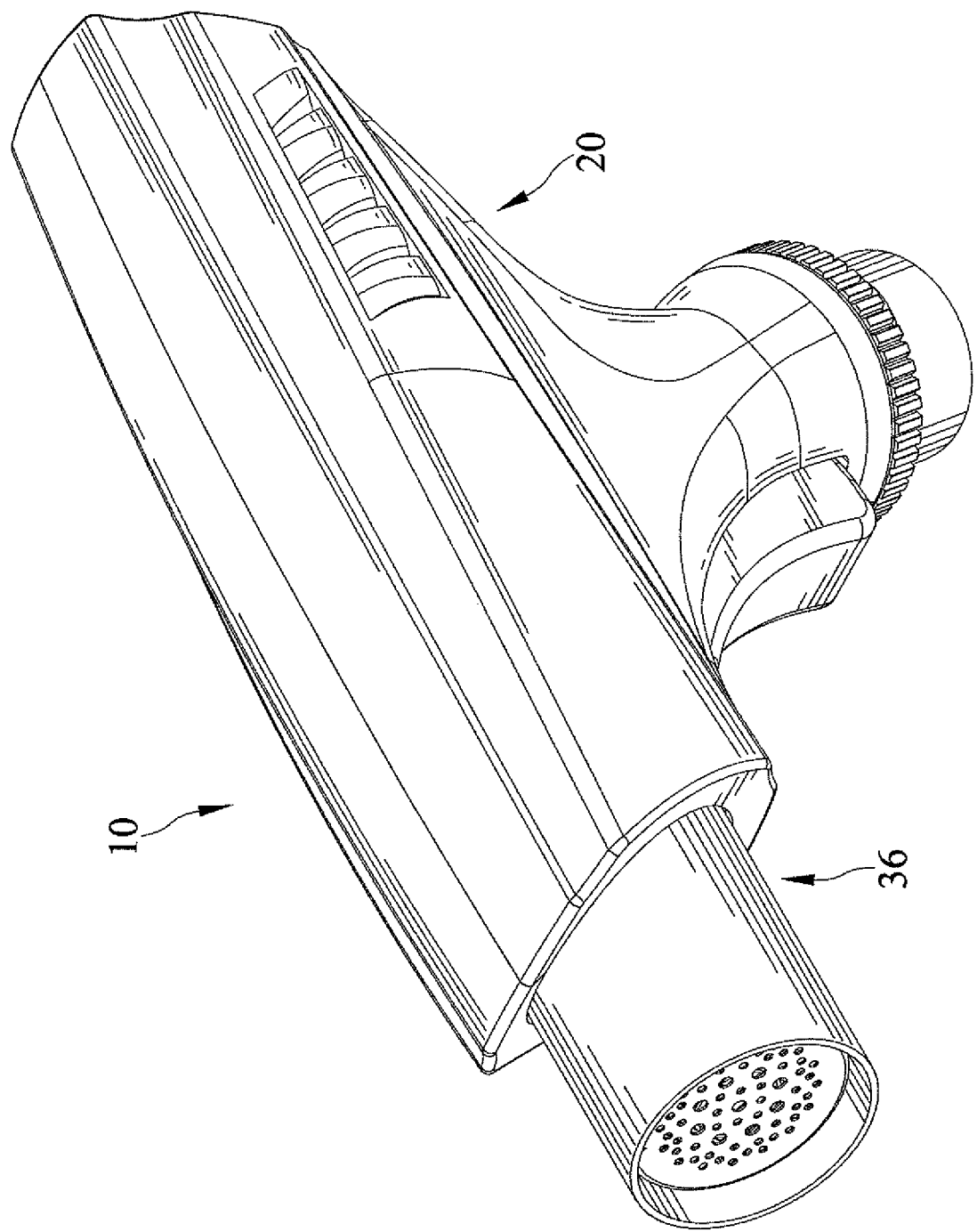
FIG. 1 is a perspective view of a burning device with an air amplifier according to the present invention.
Figure 2:
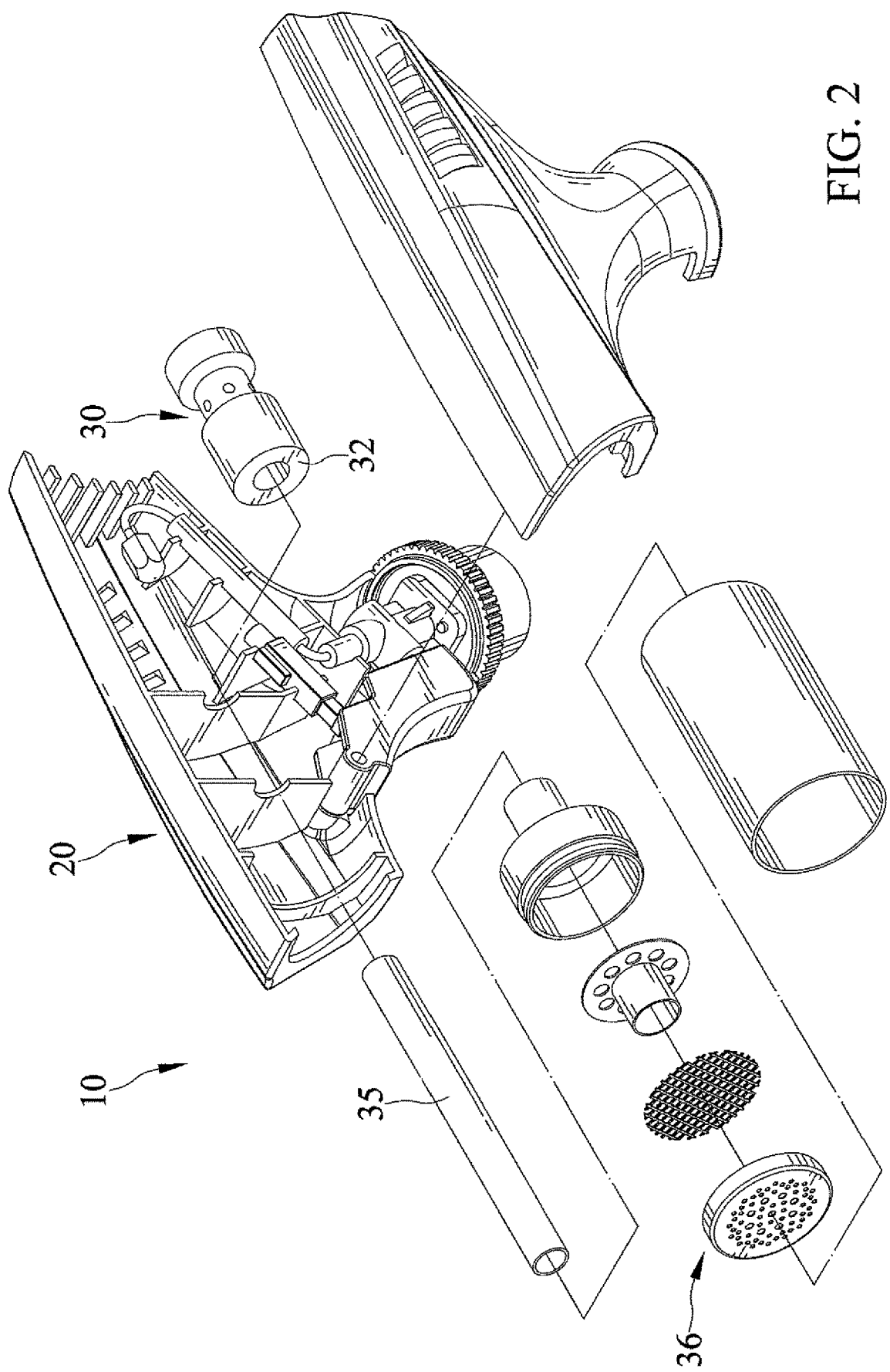
FIG. 2 is an exploded, perspective view of the burning device of FIG. 1.
Figure 3:
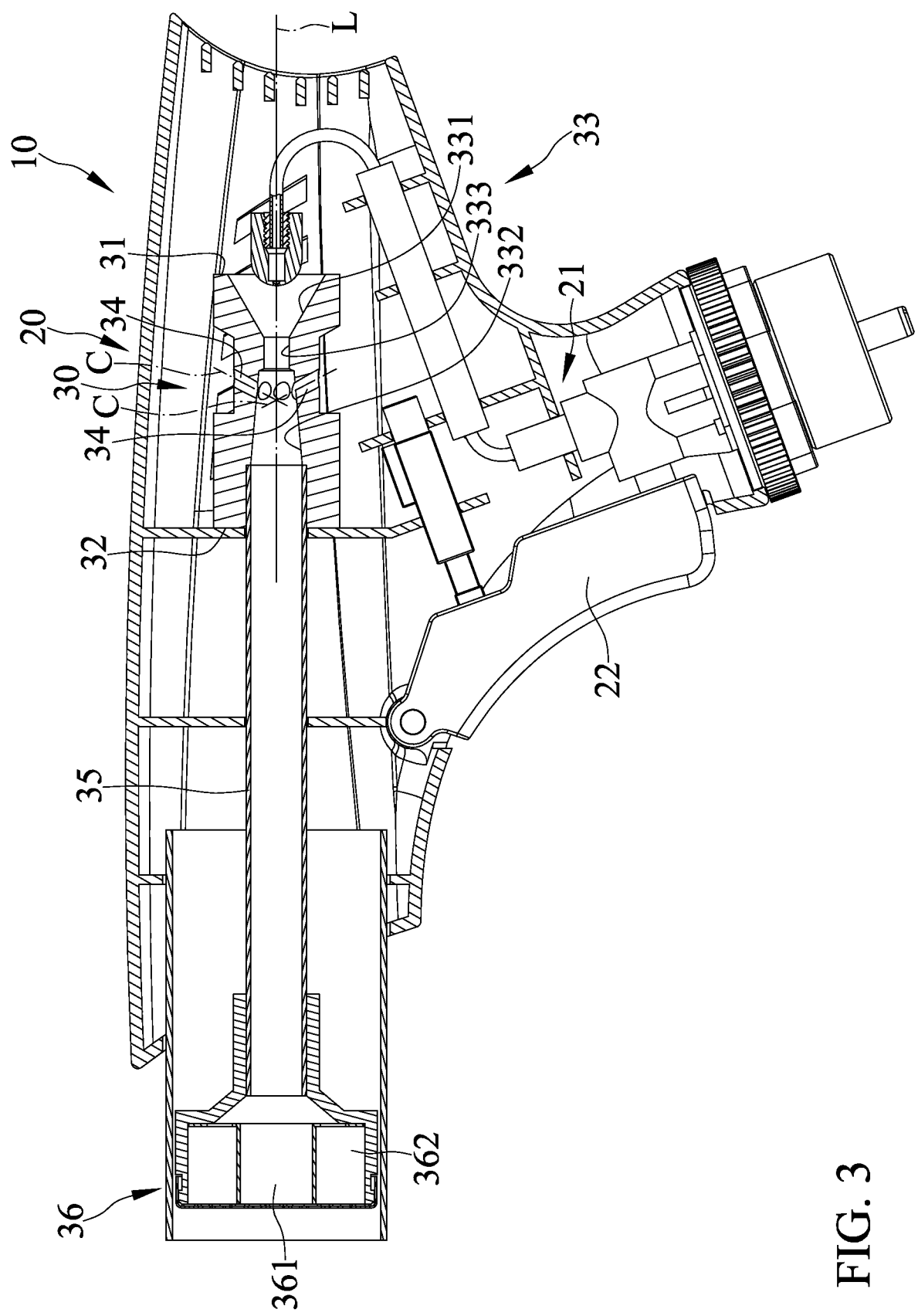
FIG. 3 is a cross sectional view of the burning device of FIG. 1.

With reference to FIGS. 1-3, a burning device 10 with an air amplifier according to the present invention includes a body 20 and an air amplifier 30.

The body 20 includes a fuel gas supplier 21 and a trigger 22 connected to the fuel gas supplier 21. The trigger 22 is configured to control opening and closing of the fuel gas supplier 21.

The air amplifier 30 is mounted in the body 20 and includes an inlet 31 and an outlet 32 opposite to the inlet 31. The inlet 31 of the air amplifier 30 is connected to the fuel gas supplier 21. The air amplifier 30 includes a fuel channel 33 extending along a longitudinal axis L and having two ends respectively connected to the inlet 31 and the outlet 32.

The fuel channel 33 includes an inlet section 331 adjacent to the inlet 31 and an outlet section 332 adjacent to the outlet 32. The fuel channel 33 further includes an intermediate section 333 between the inlet section 331 and the outlet section 332. Each of the inlet section 331, the intermediate section 333, and the outlet section 332 has a width in a width direction perpendicular to the longitudinal axis L. The width of the inlet section 331 gradually decreases from the inlet 31 towards the intermediate section 333. The width of the outlet section 332 gradually increases from the intermediate section 333 towards the outlet 32. The width of the intermediate section 333 is smaller than the width of the inlet section 331 and the width of the outlet section 332.

The air amplifier 30 includes a plurality of side channels 34. Each of the plurality of side channels 34 extends along an extending axis C not intersecting with the longitudinal axis L (see FIG. 6). Each of the plurality of side channels 34 includes an inner end intercommunicating with the fuel channel 33 and an outer end intercommunicating with an outer periphery of the air amplifier 30. A spacing between the outer end of each of the plurality of side channels 34 and the inlet 31 along the longitudinal axis L is smaller than a spacing between the inner end of each of the plurality of side channels 34 and the inlet 31 along the longitudinal axis L. Each of the plurality of side channels 34 passively introduces air from an outside of the air amplifier 30. Each of the plurality of side channels 34 intercommunicates with the outlet section 332 of the fuel channel 33.

The burning device 10 further includes an extension tube 35 having a first end connected to the outlet 32 of the air amplifier 30 and a second end opposite to the first end. The extension tube 35 has an inner width in the width direction perpendicular to the longitudinal axis L. The inner width of the extension tube 35 is equal to a maximum width of the outlet section 332 in the width direction.

The burning device 10 further includes a self-cooling device 36 connected to the second end of the extension tube 35. The self-cooling device 36 includes a central zone 361 and a peripheral zone 362. The peripheral zone 362 surrounds the central zone 361 about the longitudinal axis L. The extension tube 35 is configured to blow out a large portion of a mixture of air and a fuel gas via the central zone 361. The peripheral zone 362 includes a side opposite to the extension tube 35 and is configured to suck air via the side thereof, thereby achieving a self-cooling effect.

Figure 4:
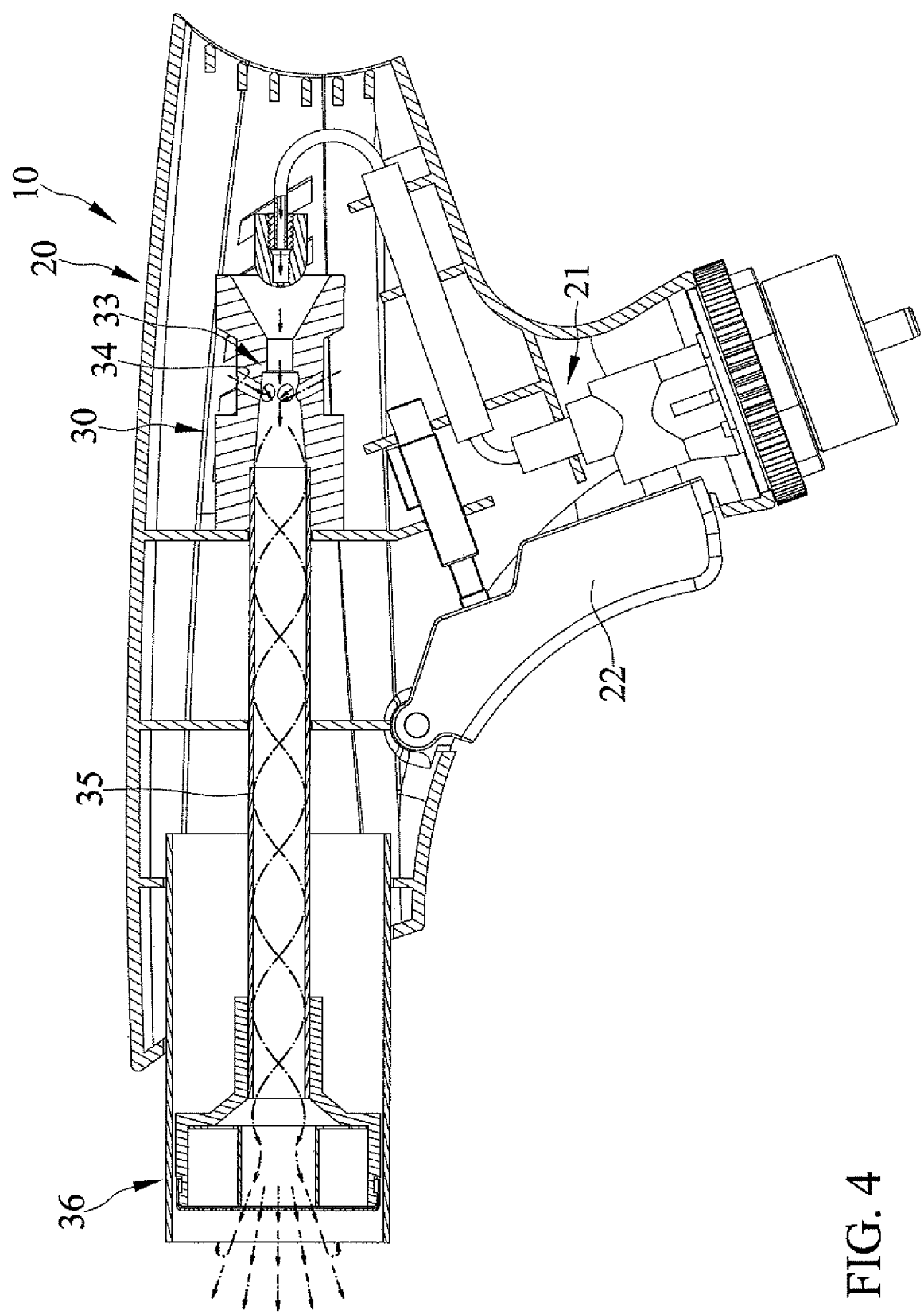
FIG. 4 is a cross sectional view illustrating use of the burning device of FIG. 1.
Figure 5:
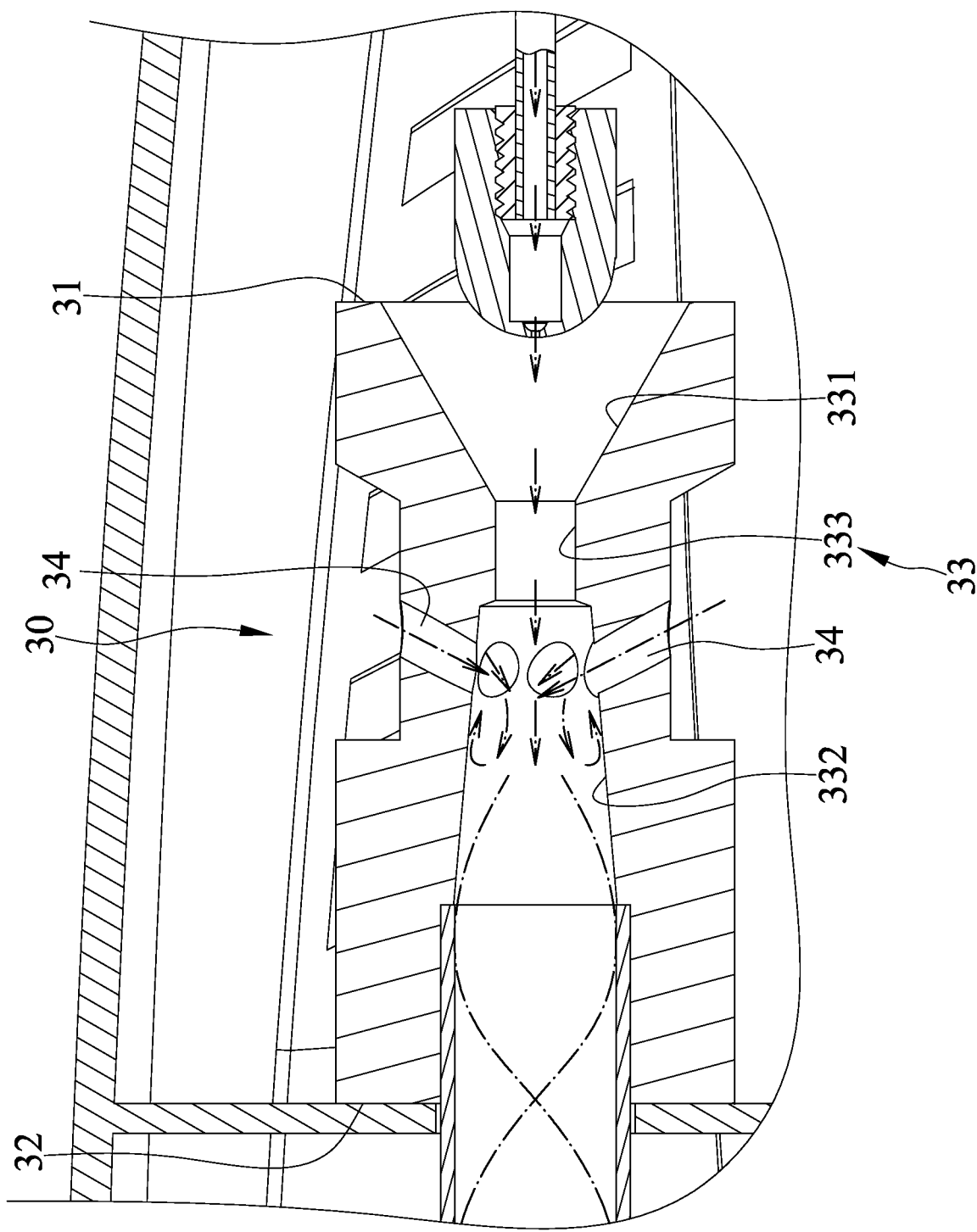
FIG. 5 is an enlarged view of a portion of FIG. 4.
Figure 6:
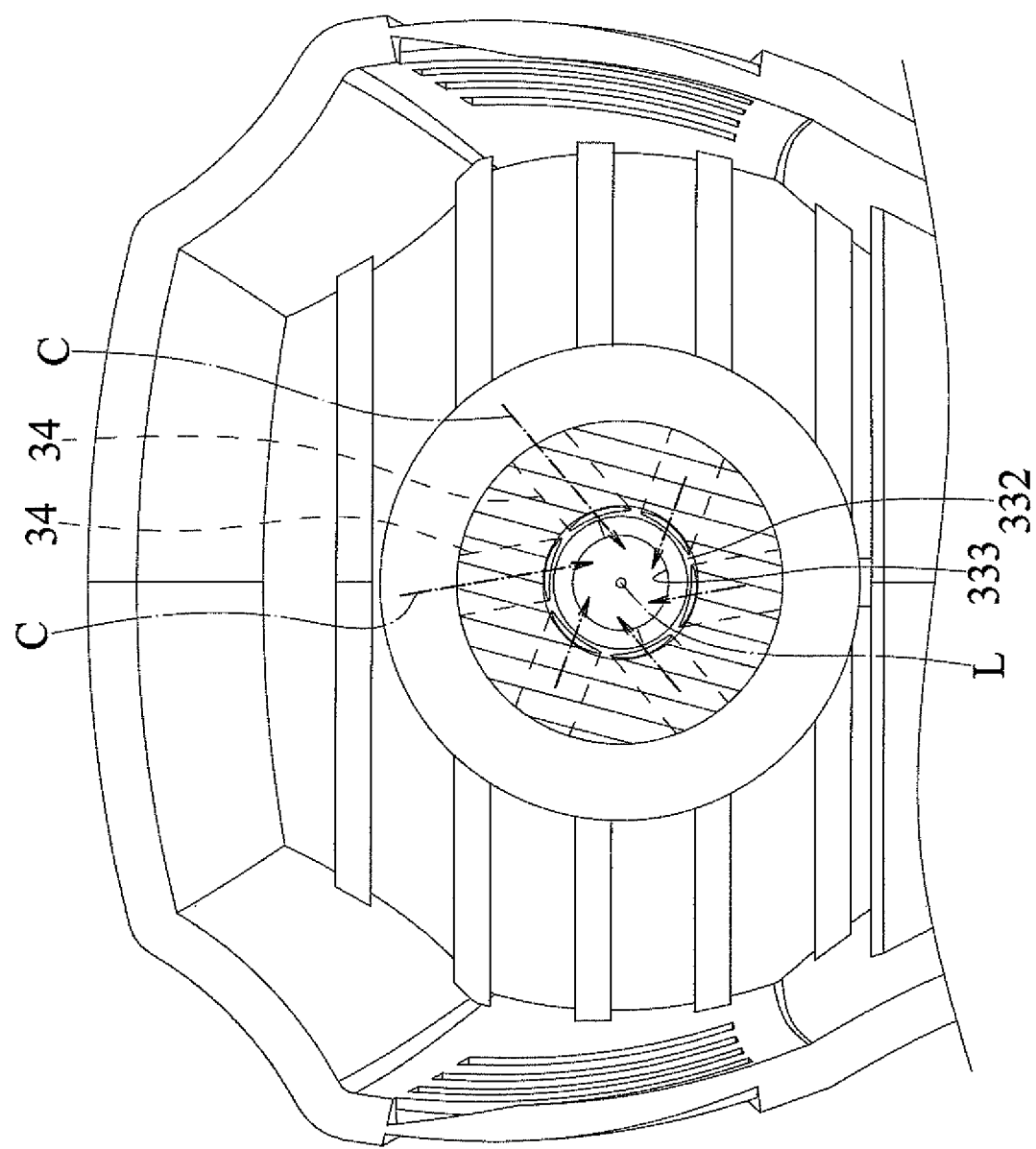
FIG. 6 is an enlarged, partial, schematic view illustrating use of the burning device of FIG. 1 from another perspective.

With reference to FIGS. 4-6, in use of the burning device 10, a user pulls the trigger to eject a fuel gas from the fuel gas supplier 21 towards the air amplifier 30. The fuel gas is ignited. The fuel gas flows into the inlet 31, passes through the fuel channel 33, and exits the outlet 32. When the fuel gas passes through the fuel passage 33, the air amplifier 30 can draw in external air via the plurality of side channels 34 to increase the amount of airflow of the hot wind outputted by the burning device 10. Furthermore, since each of the plurality of side channels 34 is inclined, when the air enters the fuel channel 33 from the plurality of side channels 34 and mixes with the fuel gas, the gas current in the burning device 10 forms a turbulent current that makes the mixture of the fuel gas and the air more uniform while increasing the blowing distance of the hot wind outputted from the burning device 10.

Although specific embodiments have been illustrated and described, numerous modifications and variations are still possible without departing from the scope of the invention. The scope of the invention is limited by the accompanying claims.

The invention claimed is:

1. A burning device with an air amplifier, comprising:
a body;
an air amplifier mounted in the body, wherein the air amplifier includes an inlet and an outlet opposite to the inlet, wherein the air amplifier includes a fuel channel extending along a longitudinal axis and having two ends respectively connected to the inlet and the outlet, wherein the fuel channel includes an inlet section adjacent to the inlet and an outlet section adjacent to the outlet, wherein the fuel channel further includes an intermediate section between the inlet section and the outlet section, wherein each of the inlet section, the intermediate section, and the outlet section has a width in a width direction perpendicular to the longitudinal axis, wherein the width of the inlet section gradually decreases from the inlet towards the intermediate section, wherein the width of the outlet section gradually increases from the intermediate section towards the outlet, wherein the width of the intermediate section is smaller than the width of the inlet section and the width of the outlet section, wherein the air amplifier includes a plurality of side channels, wherein each of the plurality of side channels extends along an extending axis not intersecting with the longitudinal axis, and wherein each of the plurality of side channels includes an inner end intercommunicating with the fuel channel and an outer end intercommunicating with an outer periphery of the air amplifier;
an extension tube having a first end connected to the outlet of the air amplifier;
a self-cooling device including a central zone and a peripheral zone, wherein the peripheral zone surrounds the central zone about the longitudinal axis, wherein the extension tube further includes a second end opposite to the air amplifier and connected to the self-cooling device, wherein the extension tube is configured to blow out a large portion of a mixture of air and a fuel gas via the central zone, and wherein the peripheral zone includes a side opposite to the extension tube and is configured to suck air via the side thereof.

2. The burning device with an air amplifier as claimed in claim 1, wherein the extension tube has an inner width in the width direction perpendicular to the longitudinal axis, and wherein the inner width of the extension tube is equal to a maximum width of the outlet section in the width direction.

3. The burning device with an air amplifier as claimed in claim 1, wherein each of the plurality of side channels passively introduces air from an outside of the air amplifier.

4. The burning device with an air amplifier as claimed in claim 3, wherein each of the plurality of side channels intercommunicates with the outlet section of the fuel channel.

5. The burning device with an air amplifier as claimed in claim 4, wherein a spacing between the outer end of each of the plurality of side channels and the inlet along the longitudinal axis is smaller than a spacing between the inner end of each of the plurality of side channels and the inlet along the longitudinal axis.

6. The burning device with an air amplifier as claimed in claim 1, wherein the body includes a fuel gas supplier and a trigger connected to the fuel gas supplier, wherein the trigger is configured to control opening and closing of the fuel gas supplier, and wherein the inlet of the air amplifier is connected to the fuel gas supplier.

* * * * *